(12) United States Patent
Yuan et al.

(10) Patent No.: US 12,039,305 B2
(45) Date of Patent: Jul. 16, 2024

(54) METHOD FOR COMPILATION, ELECTRONIC DEVICE AND STORAGE MEDIUM

(71) Applicants: Beijing Superstring Academy of Memory Technology, Beijing (CN); Tsinghua University, Beijing (CN)

(72) Inventors: Baofen Yuan, Beijing (CN); Shouyi Yin, Beijing (CN); Shaojun Wei, Beijing (CN)

(73) Assignees: Beijing Superstring Academy of Memory Technology, Beijing (CN); Tsinghua University, Beijing (CN)

( * ) Notice: Subject to any disclaimer, the term of this patent is extended or adjusted under 35 U.S.C. 154(b) by 257 days.

(21) Appl. No.: 17/688,606

(22) Filed: Mar. 7, 2022

(65) Prior Publication Data
US 2023/0116546 A1    Apr. 13, 2023

(30) Foreign Application Priority Data

Oct. 11, 2021 (CN) .......................... 202111184224.9

(51) Int. Cl.
*G06F 8/41* (2018.01)
*G06F 9/38* (2018.01)

(52) U.S. Cl.
CPC .............. *G06F 8/433* (2013.01); *G06F 8/427* (2013.01); *G06F 8/47* (2013.01); *G06F 9/3818* (2013.01)

(58) Field of Classification Search
USPC ....................................................... 717/105
See application file for complete search history.

(56) References Cited

U.S. PATENT DOCUMENTS

| | | | | |
|---|---|---|---|---|
| 5,922,070 A * | 7/1999 | Swoboda | .............. | G06F 9/3863 |
| | | | | 712/E9.05 |
| 6,070,009 A * | 5/2000 | Dean | ................... | G06F 11/3466 |
| | | | | 717/130 |
| 2011/0238948 A1* | 9/2011 | Vorbach | .............. | G06F 15/7867 |
| | | | | 712/15 |
| 2011/0283059 A1* | 11/2011 | Govindarajan | ......... | G06T 15/06 |
| | | | | 712/30 |
| 2014/0215183 A1* | 7/2014 | Yazdani | .............. | G06F 9/30058 |
| | | | | 712/24 |
| 2014/0215187 A1* | 7/2014 | Yazdani | ................. | G06F 8/445 |
| | | | | 712/206 |
| 2015/0347108 A1* | 12/2015 | Munshi | ................... | G06F 8/427 |
| | | | | 717/146 |

(Continued)

OTHER PUBLICATIONS

Mahdi Hamzeh et al., 2013. REGIMap: register-aware application mapping on coarse-grained reconfigurable architectures (CGRAs). In Proceedings of the 50th Annual Design Automation Conference (DAC '13). Association for Computing Machinery, New York, NY, USA. (Year: 2013).*

(Continued)

*Primary Examiner* — Jason D Mitchell
(74) *Attorney, Agent, or Firm* — Brooks Kushman, P.C.

(57) ABSTRACT

A method for a compilation, an electronic device and a readable storage medium are provided. The method for a compilation includes analyzing source program data to determine a target irregular branch, generating an update data flow graph according to the target irregular branch, and mapping the update data flow graph to a target hardware to complete the compilation.

16 Claims, 6 Drawing Sheets

(56) References Cited

U.S. PATENT DOCUMENTS

| | | | |
|---|---|---|---|
| 2017/0024848 A1* | 1/2017 | Harris | G06F 8/41 |
| 2018/0373509 A1* | 12/2018 | Zhang | G06F 8/37 |
| 2019/0392296 A1* | 12/2019 | Brady | G06N 3/063 |
| 2021/0342155 A1* | 11/2021 | Homer | G06F 9/3861 |
| 2022/0413911 A1* | 12/2022 | Thompto | G06F 9/5038 |
| 2023/0116546 A1* | 4/2023 | Liu | G06F 8/433 717/143 |
| 2023/0205501 A1* | 6/2023 | Chen | G06F 8/453 717/151 |

OTHER PUBLICATIONS

Mahdi Hamzeh et al. 2012. EPIMap: using epimorphism to map applications on CGRAs. In Proceedings of the 49th Annual Design Automation Conference (DAC '12). Association for Computing Machinery, New York, NYy, USA. (Year: 2012).*

Mahdi Hamzeh et al. 2014. Branch-Aware Loop Mapping on CGRAs. In Proceedings of the 51st Annual Design Automation Conference (DAC '14). Association for Computing Machinery, New York, NY, USA (Year: 2014).*

NPL (Year: 2012).*

NPL (Year: 2014).*

* cited by examiner

METHOD FOR COMPILATION, ELECTRONIC DEVICE AND STORAGE MEDIUM

CROSS-REFERENCE TO RELATED APPLICATION

This application claims the priority of Chinese Patent Application No. 202111184224.9 filed on Oct. 11, 2021 in the China National Intellectual Property Administration, the content of which is incorporated herein by reference in entirety.

TECHNICAL FIELD

The present disclosure relates to a field of computer technology, and in particular to a method for a compilation, an electronic device, and a computer-readable storage medium.

BACKGROUND

At present, hardware platforms, such as a microprocessor, a Coarse-Grained Reconfigurable Architecture (CGRA for short), and the like, generally adopt a pipeline technology to improve a parallelism of instruction level parallelism. However, a typical control flow-branch instruction in an instruction stream may affect the pipeline efficiency. A CGRA traditional branch processing method used for a statically scheduled and a dynamically executed is a predicate technology. The statically scheduled and the dynamically executed mean that what operation each reconfigurable processing element (PE for short) in the CGRA will execute at each time is specified by a statically generated configuration packet, and whether the PE in the CGRA may actually execute the operation specified by the configuration packet at this time is determined by a dynamic control signal or an enable signal.

The predicate technology is a compilation technology suitable for various hardware platforms and is an important component of an explicit parallel technology. The predicate technology adds a source operand (i.e., a predicate) to each instruction as an instruction execution condition, an operation in the instruction is executed in response to the predicate being true, and otherwise, the operation is converted into a null operation for processing. A predicate execution has an advantage of converting a control flow into a data flow, so as to merge basic blocks that originally form a branch into a super block, and increase a granularity of compilation and scheduling, thereby increasing the instruction level parallelism in the basic blocks, while effectively improving performances of a software pipeline or a dular scheduling. An existing predicate technology generally performs a uniform conversion processing on various branch instructions and does not perform a customized optimization according to the characteristics of a branch structure. Therefore, the effect of acceleration by using a single existing predicate technology is limited in some application scenes, and particularly when an irregular branch is processed, the existing predicate technology conservatively performs software pipeline through a maximum II (Initial interval, II for short, the initial interval is a time interval between the start of two consecutive iterations) of an overall branch structure, and fails to accelerate a short path in the branch.

SUMMARY

One aspect of the present disclosure provides a method for a compilation, including: analyzing source program data to determine a target irregular branch; generating an update data flow graph according to the target irregular branch; and mapping the update data flow graph to a target hardware to complete the compilation.

According to the embodiments of the present disclosure, the analyzing source program data to determine a target irregular branch includes: analyzing the source program data to determine corresponding initial conversion data; and determining the target irregular branch based on an initial interval set generated from the initial conversion data.

According to the embodiments of the present disclosure, the analyzing the source program data to determine corresponding initial conversion data includes: parsing the source program data by a compiler front end to generate an intermediate representation; and converting the intermediate representation into an initial data flow graph and an initial control flow graph by using a graph generation technology, wherein the initial data flow graph and the initial control flow graph are the initial conversion data.

According to the embodiments of the present disclosure, the determining the target irregular branch based on an initial interval set generated from the initial conversion data includes: determining the initial interval set corresponding to the initial data flow graph and the initial control flow graph according to a number of computing units of the target hardware, wherein the initial interval set contains a long-path initial interval and a short-path initial interval; and determining the target irregular branch according to a size relationship between the long-path initial interval and the short-path initial interval.

According to the embodiments of the present disclosure, the determining the initial interval set corresponding to the initial data flow graph and the initial control flow graph according to a number of computing units of the target hardware includes: respectively counting a number of operations in a first basic block belonging to the initial control flow graph and a number of operations in a second basic block belonging to the initial control flow graph, so as to determine a path length of a branch structure and the initial interval set.

According to the embodiments of the present disclosure, the generating an update data flow graph according to the target irregular branch includes: determining a target node of the target irregular branch; and generating the update data flow graph according to a data dependency relationship of the target node and an operation control relationship between the target node and the initial data flow graph.

According to the embodiments of the present disclosure, the determining a target node of the target irregular branch includes: determining a number of node replication times of the target irregular branch according to an output overall-branch pipeline kernel and an path initial interval relationship of the target irregular branch, wherein the path initial interval relationship is a preset relationship between the number of node replication times, the overall-branch pipeline kernel, and an initial interval of a long-path pipeline kernel, wherein the initial interval of the long-path pipeline kernel is correspond to the target irregular branch; and performing a replication on a node contained in the target irregular branch for the number of node replication times, so as to determine the target node of the target irregular branch.

According to the embodiments of the present disclosure, the generating the update data flow graph according to a data dependency relationship of the target node and an operation control relationship between the target node and the initial data flow graph includes: adding a corresponding data edge and a corresponding control edge for the target node in the initial data flow graph and adding a corresponding control edge for a node of the target irregular branch in the initial data flow graph according to a data dependency relationship of the initial data flow graph and a control dependency relationship of an initial path switching, so as to generate the update data flow graph.

According to the embodiments of the present disclosure, the mapping the update data flow graph to a target hardware to complete the compilation includes: mapping the update data flow graph to a time-expanded abstract graph of the target hardware to generate a mapping result; and performing a translate conversion on the mapping result to obtain a binary configuration file executed on the target hardware, so as to complete the compilation.

According to the embodiments of the present disclosure, the mapping the update data flow graph to a time-expanded abstract graph of the target hardware to generate a mapping result includes: determining an execution time of at least one operation in the update data flow graph; building a mapping relationship between the at least one operation and at least one computing unit of the target hardware according to the execution time; and mapping at least one edge in the update data flow graph to a corresponding edge of an interconnect line in the abstract graph according to the mapping relationship, so as to generate the mapping result.

According to the embodiments of the present disclosure, the building a mapping relationship between the at least one operation and at least one computing unit of the target hardware according to the execution time includes: querying the at least one computing unit not occupied in the execution time; querying a hardware interconnect resource not occupied in the execution time; and mapping the at least one operation to a unit label of the at least one computing unit respectively, and mapping the at least one edge to the hardware interconnect resource respectively, so as to build the mapping relationship.

According to the embodiments of the present disclosure, the performing a translate conversion on the mapping result to obtain a binary configuration file executed on the target hardware, so as to complete the compilation includes: performing an information extraction and conversion on the mapping result according to a configuration package format of the target hardware, so as to generate the binary configuration file; and executing the binary configuration file through the target hardware.

According to the embodiments of the present disclosure, before the generating an update data flow graph according to the target irregular branch, the method further includes: analyzing a size relationship between minimum initial intervals of a plurality of pipeline solutions corresponding to the source program data; and selecting a pipeline solution having a smallest minimum initial interval from the plurality of pipeline solutions as a target pipeline solution according to the size relationship between the minimum initial intervals, wherein the plurality of pipeline solutions contain a first pipeline solution based on a partial predication technology, a second pipeline solution based on a full predication technology, and a third pipeline solution based on the above mentioned method; and wherein the generating an update data flow graph according to the target irregular branch includes: generating the update data flow graph according to the target irregular branch when the target pipeline solution is the third pipeline solution.

According to the embodiments of the present disclosure, the analyzing a size relationship between minimum initial intervals of a plurality of pipeline solutions corresponding to the source program data includes: parsing the source program data to determine initial conversion data; and determining, according to a number of computing units of the target hardware, an achievable first minimum initial interval, an achievable second minimum initial interval and an achievable third minimum initial interval when the first pipeline solution, the second pipeline solution and the third pipeline solution are respectively used for the initial conversion data to process a branch, so as to determine a size relationship between the minimum initial interval of the first pipeline solution, the minimum initial interval of the second pipeline solution and the minimum initial interval of the third pipeline solution.

According to the embodiments of the present disclosure, the selecting a pipeline solution having a smallest minimum initial interval from the plurality of pipeline solutions as a target pipeline solution according to the size relationship between the minimum initial intervals includes: determining one of the first pipeline solution, the second pipeline solution and the third pipeline solution as the target pipeline solution by comparing the first minimum initial interval, the second minimum initial interval and the third minimum initial interval; wherein one of the first pipeline solution, the second pipeline solution and the third pipeline solution is determined as the target pipeline solution according to a carrying capacity of the target hardware when the first minimum initial interval, the second minimum initial interval and the third minimum initial interval are identical to each other.

According to the embodiments of the present disclosure, the method further includes: adding a fine-grained select signal to an initial data flow graph of an initial conversion data according to a selection operation when the pipeline solution is the first pipeline solution; adding a fine-grained enable control edge to an initial data flow graph of an initial conversion data when the pipeline solution is the second pipeline solution; and adding a node, a coarse-grained data edge and a fine-grained enable control edge to an initial data flow graph of an initial conversion data when the pipeline solution is the third pipeline solution.

Another aspect of the present disclosure provides an electronic device including: one or more processors; a storage apparatus for storing one or more programs, wherein the one or more programs, when executed by the one or more processors, cause the one or more processors to perform the above-mentioned method for a compilation.

Another aspect of the present disclosure provides a computer-readable storage medium having stored thereon executable instructions that, when executed by a processor, cause the processor to perform the above-mentioned method for a compilation.

DETAILED DESCRIPTION OF EMBODIMENTS

Figure 1:
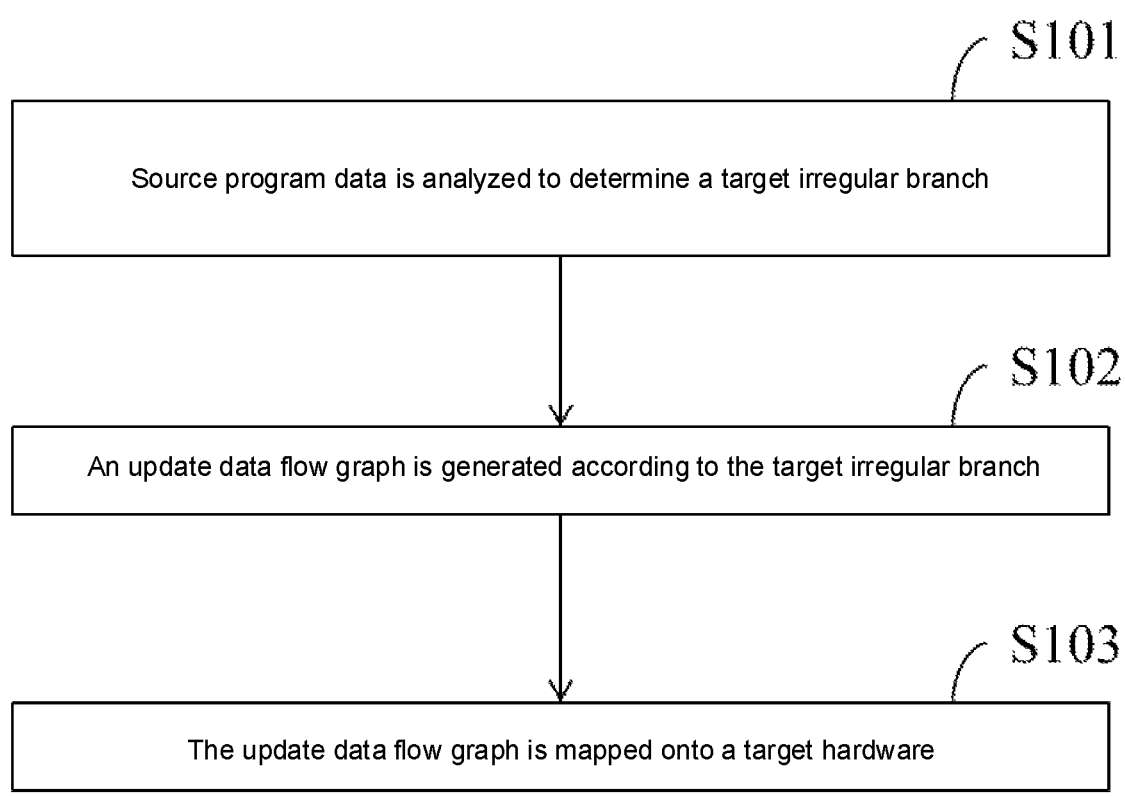
FIG. 1 schematically illustrates a flowchart of a method for a compilation according to the embodiments of the present disclosure.

In order to make the purpose, technical solutions, and advantages of the present disclosure more clear, the present disclosure is further described below in detail with reference to the embodiments and the drawings.

It should be noted that implementations not shown or described in the drawings or in the text of the description are in a form known to those skilled in the art and are not described in detail. In addition, the above definitions of various elements and methods are not limited to specific structures, shapes or manners mentioned in the embodiments, which may be simply modified or substituted by those skilled in the art.

It should also be noted that directional terms mentioned in the embodiments, such as "up", "down", "front", "back", "left", "right", etc., are only directions of the drawings, and are not intended to limit the protection scope of the present disclosure. Throughout the drawings, same elements are represented by the same or similar reference numerals. Conventional structures or constructions will be omitted when they may obscure an understanding of the present disclosure.

Shapes and sizes of components in the drawings do not reflect actual sizes and proportions, but merely illustrate contents of the embodiments of the present disclosure. Moreover, in the claims, any reference symbols placed between parentheses shall not be construed as a limit of the claims.

Furthermore, the word "comprising" does not exclude a presence of elements or steps not listed in the claims. The word "a" or "an" preceding an element does not exclude a presence of a plurality of such elements.

The use of ordinal numbers such as "first," "second," "third," etc., in the description and claims to modify a corresponding element does not by itself connote any ordinal number of the element, nor the order in which an element is sequenced with another element or in a method of manufacture. The use of such ordinal numbers is only used to clearly distinguish one element having a certain name from another element having a same name.

Those skilled in the art will appreciate that modules in a device in the embodiments may be adaptively changed and arranged in one or more devices different from the embodiments. Modules or units or components in the embodiments may be combined into one module or unit or component, and furthermore, they may be divided into a plurality of sub-modules or sub-units or sub-components. All features disclosed in the description (including the claims, abstract and drawings) and all processes or elements of any method or devices so disclosed may be combined in any combination, except at least some of such features and/or processes or elements are mutually exclusive. Each feature disclosed in the description (including the claims, abstract and drawings) may be replaced by alternative features serving the same, equivalent or similar purpose, unless expressly stated otherwise. Also, in a unit claim enumerating several means, several of these means may be embodied by one and the same item of hardware.

Similarly, it should be appreciated that in the above description of exemplary embodiments of the present disclosure, various features of the present disclosure are sometimes grouped together in a single embodiment, figure, or description thereof, in order to simplify the present disclosure and to aid in an understanding of one or more of various disclosed aspects. However, the disclosed method should not be construed to reflect an intent that: the present disclosure as claimed requires more features than those are expressly recited in each claim. Rather, as the following claims reflect, disclosed aspects lie in less than all features of a single embodiment previously disclosed. Thus, the claims following the Detailed Description are hereby expressly incorporated into the detailed description, with each claim standing on its own as a separate embodiments of the present disclosure.

The existing predicate technology is mainly divided into two solutions, i.e., a Partial Prediction (PP for short) solution and a Full Prediction (FP for short) solution.

In the PP solution, operations in two paths of a branch structure may be mapped to different computing units and may be executed simultaneously. Before being used, all variables updated by the branch structure need to go through a selection operation, a correct value of the variables after branching is obtained according to a conditional execution result, so as to facilitate a subsequent use. When the branch has a large number of operations, a predicate network needs to be constructed, so as to route a condition calculation result to the selection operation corresponding to each variable which may be modified by the branch. In a worst case, a total of 3N nodes are required in order to map a branch structure (If-Then-Else, ITE for short) having N operations on each path. Therefore, the PP solution has significant drawbacks that: (1) extra selection operations need to be added, which increases a Data Flow Graph (DFG for short) size and affect compilation time; (2) these additional selection operations consume additional time, computing resources and energy consumption when executed; (3) when software pipeline is performed on an irregular branch, an initial interval (II for short) obtained by the PP solution processing the branch is limited by a long path in the branch, and fails to explore a potential performance optimization space when a short path is executed.

In addition, the FP solution statically maps all branch operations, and maps an operation for updating the same variable in the branch to different time steps of the same computing unit. Only an operation selected according to conditions is executed at runtime. Since a final value of the variable comes from a fixed calculation unit, no additional selection operation is required. An ITE structure having N operations on any path is mapped. In the worst case, the number of operation nodes in a full predicate Data Flow Graph (DFG for short) is 2N, and a layout constraint on the 2N nodes need to be added. The FP solution has main disadvantages that: (1) the layout constraint is provided so that an initial interval (II for short) is at least 2; (2) when a program has an inter-iteration dependence on a variable updated by both branches, the II is large since the variable is not available until after a scheduling time of two branch operations; (3) the II of FP is constrained by a long path II and may not optimize an execution of the irregular branch.

Therefore, in order to solve at least one of the above-mentioned problems in the existing predicate technology, the embodiments of the present disclosure provide a method for a compilation, an apparatus for a compilation, an electronic device and a computer-readable storage medium, so as to fully mine characteristics of a branch structure in a program and select a suitable branch processing mechanism for the branch structure, thereby maximizing a performance benefit while solving a problem of a poor performances when an irregular branch is processed by an existing predicate technology.

As shown in FIG. 1 to FIG. 4, one aspect of the present disclosure provides a method for a compilation, including steps S101 to S103.

In step S101, source program data is analyzed to determine a target irregular branch.

In step S102, an update data flow graph is generated according to the target irregular branch.

In step S103, the update data flow graph is mapped to a target hardware, so as to complete the compilation.

It should be understood that the embodiments of the present disclosure may be used to optimize all irregular branches, or may select and optimize some of the irregular branches as required. Accordingly, a branch determined to be optimized in the embodiments of the present disclosure is called a target irregular branch.

In one example, the source program data is initial compilation data provided by a source program to be compiled, and may specifically be basic compilation data corresponding to a language source program such as C, C++, or the like. The target irregular branch is a branch structure corresponding to the source program data obtained after analyzing and processing the initial compilation data, and the branch structure is a target branch that is optimized for the method of the embodiments of the present disclosure to complete the compilation purpose. The update data flow graph is update data of a data flow graph generated by the initial compilation data. Specifically, the update data at least includes data newly added by copying the target irregular branch.

The target hardware is used to execute specific contents of the above-mentioned update data flow graph, which has an expanded hardware abstract image. The target hardware may generate a corresponding hardware result according to a mapping process of the update data flow graph, so as to complete the compilation. For example, the target hardware may be understood as an embedded controller.

Therefore, compared with a situation that the FP and PP solutions in the prior art may not perform an optimization processing on an irregular branch, the method according to the embodiments of the present disclosure may fully mine characteristics (including an irregular branch structure) of the branch structure in the source program, so as to solve the problem of poor performances when the irregular branch is processed by the existing predicate technology, thereby maximizing a performance benefit of a compilation process.

Figure 2:
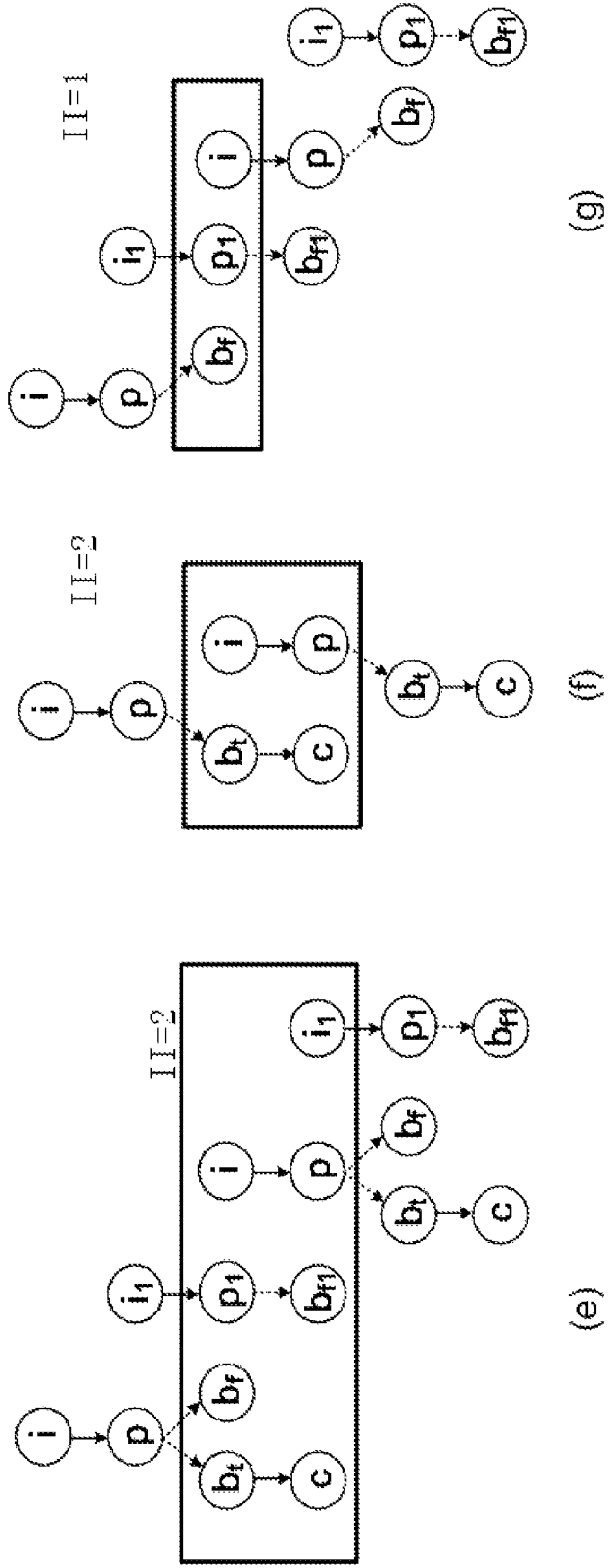
FIG. 2 schematically illustrates a schematic diagram regarding a DIP method and DIP_DFG generation in a method for a compilation according to the embodiments of the present disclosure.
Figure 3:
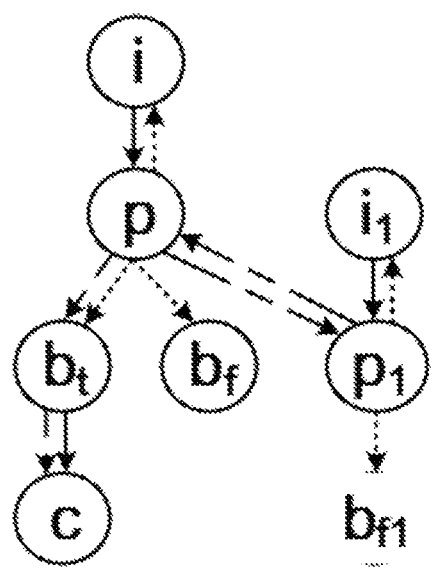
FIG. 3 schematically illustrates a composition diagram of an update data flow graph DIP_DFG of a method for a compilation according to the embodiments of the present disclosure.

Generally, a branch structure includes two typical paths, i.e., a true-path and a false-path, and IIs of the two paths are different due to the number of nodes included in the two paths. The method according to the embodiments of the present disclosure respectively constructs pipelines for the two paths, so that an overall branch structure may have two IIs. When the branch structure is operated, a pipeline is dynamically selected for execution according to the condition calculation result. In order to reduce the number of nodes of the DFG as much as possible, while considering a control dependency relationship when two pipelines are switched, partial condition calculation nodes of the short path and the long path may be shared. Therefore, the above-mentioned method according to the embodiments of the present disclosure may be used to process the irregular branch, so as to improve compilation efficiency. As shown in FIG. 2 and FIG. 3, a specific implementation process of the embodiments of the present disclosure is as follows:

(1) the number of examples $N_{true\text{-}path}$ and $N_{false\text{-}path}$ of the long and short paths in the DFG, i.e., the number of paths that needs to be copied, is determined according to timing requirements when an II of each path, a kernel length of the overall branch and a condition node is shared, and corresponding long-path and short-path examples are added in the graph.

For a source program of a ITE-containing loop shown in (a) of FIG. 2, assuming that the number of computing units is 4, as shown in below-mentioned II computing formulas (1) to (3), path IIs achievable by the method according to the embodiments of the present disclosure are $II_T=2$ and $II_F=1$, respectively (in this case, the long path is a true-path and the short path is a false-path, so II_long=$II_T$ and II_short=$II_F$). Since $II_T$ is divisible by $II_F$, a true-path conditional computation node is shared with the false-path. An example of the false-path is 2 and an example of the true-path is 1. A pipeline kernel (a box in a schematic diagram of an overall branch pipeline shown in (e) of FIG. 2) of the overall branch has a length of 2, and contains 1 long-path (true-path) iteration and 2 short-path (false-path) iterations. Respective pipelines of the long and short paths are as shown in a schematic diagram of a true-path software pipeline in (f) of FIG. 2 and in a schematic diagram of a false-path software pipeline in (g) of FIG. 2. In addition, correspondingly, (b) of FIG. 2 shows a schematic diagram of a PP solution conversion, (c) of FIG. 2 shows a PP_DFG corresponding to the PP solution, and (d) of FIG. 2 shows a FP_DFG corresponding to the FP solution.

FIG. 3 shows a DFG (i.e., an update data flow graph) involved in the method according to the embodiments of the present disclosure, in which an edge (a dashed line of p-p$_1$ as shown in FIG. 3) for a mutual control between conditional computation nodes in different examples, a direct enable edge (dashed lines of p-i, p-b$_t$, p-b$_f$, p$_1$-i$_1$, p$_1$-b$_{f1}$ as shown in FIG. 3) between the conditional computation nodes and other nodes, and an enable transitive edge (dashed lines of p-b$_t$, b$_t$-c as shown in FIG. 3) between computation nodes are added according to a conditional enable relationship. It should be noted that a fine-grained enable signal transmission process when the long and short paths are switched needs to be analyzed correctly, so as to ensure a correctness of the program, especially when a condition node of the switching only belongs to the short path.

Based on the above contents, assuming that an execution process of the branch is F, F, T, F, F, F, and the source program is mapped to a target hardware platform, a total execution time using the technical solution of the embodiments of the present disclosure is 10 cycles, and a total execution time of the PP solution or the FP solution may be calculated according to Length+(N−1)×II (where Length is the time of executing one cycle, N is the number of iterations), and may thus be obtained to be 13 cycles and 14 cycles, respectively. This shows that the irregular branch may obtain a shorter total execution time than that of the FP solution and the PP solution by using the method according to the embodiments of the present disclosure.

In summary, the method according to the embodiments of the present disclosure may effectively shorten a total execution time and an average II of an overall program by allowing the II to be dynamically variable among different iterations, and an acceleration effect is related to an execution probability of an irregular branch path. Therefore, the embodiments of the present disclosure may perform an optimization processing on the irregular branch, and fully mine characteristics of the branch structure containing the irregular branch structure in the source program to solve the problem of poor performances when the irregular branch is processed in the existing predicate technology, thereby maximizing a performance benefit in the compilation process.

Compared with the FP and PP solutions in the prior art which may not effectively perform an optimization processing on the irregular branch, the above-mentioned method for a compilation according to the embodiments of the present disclosure aims at characteristics of an irregular application, which may be regarded as a new predicate technology, i.e., a dynamic-initial interval pipeline (Dynamic-II Pipeline, DIP for short) solution. For the sake of brevity, a DIP solution will be used below to refer to the technical solution of the embodiments of the present disclosure.

The new DIP solution implements two pipelines with different IIs in one set of static configurations. In an actual program running process, a branch path to be executed is selected according to the condition calculation result, and then a corresponding pipeline is selected to be enabled, and an unselected pipeline is disabled. For different iterations, conditional computation results thereof are different, resulting in different pipelines to be selected. Therefore, during an execution of the program, the II is dynamically changed according to a calculation result of an iteration condition.

In the DIP solution of the embodiments of the present disclosure, a II value of each branch structure in the program may be optimized according to characteristics of the irregular application (in the irregular application, a case that lengths of two paths in the branch structure are different often occurs), and then a static scheduling result of the overall program is further optimized. When the source program data is converted into a DFG representation, a lower limit of II that may be achieved by the software pipeline is:

$$MII = \max(ResMII, RecMII) \quad (1)$$

where a first item ResMII represents a minimum cycle start interval limited by resources, specifically:

$$ResMII = \left\lceil \frac{N_{OP}}{N_{PE}} \right\rceil \quad (2)$$

where a numerator Nоt represents the number of operation nodes (or also represents the number of operations) in the DFG, and NPE represents the number of hardware computing units.

A second term RecMII represents a minimum start interval limited by a data dependency between loop iterations, specifically.

$$RecMII = \max_{\forall cycle_\theta} \left\lceil \frac{delay_\theta}{difference_\theta} \right\rceil \quad (3)$$

where a numerator $delay_\theta$ represents a total number of delay cycles for all operations on a loop in the DFG, and $difference_\theta$ represents an iteration distance spanned by the loop.

This shows that the II value is positively correlated with the number of operations in the DFG. When the true-path and the false-path in a branch have different path lengths, the so-called irregular branch in the embodiments of the present disclosure is formed. ResMIIT (i.e., the ResMII of the long path) and ResMIIF (i.e., the ResMII of the short path) are respectively calculated by using the number of operations contained in the long and short paths. Generally, ResMIIT≠ResMIIF. Because of $N_{OPtotal} \geq N_{OPtrue}$, $N_{OPtotal} \geq N_{OPfalse}$, a RecMII considering only one path is smaller than the ResMII calculated using all the operation nodes in the overall branch (including the true-path and the false-path).

In the DIP solution of the embodiments of the present disclosure, pipelines are respectively constructed for both the true-path and the false-path, so that the overall branch structure may have two II values. In this way, one pipeline is dynamically selected to be executed according to the condition calculation result at runtime. In order to reduce the number of nodes of the DFG involved in the DIP solution as much as possible and consider the control dependency relationship when two pipelines are switched, partial condition calculation nodes of the long and short paths may be shared. In summary, the DIP solution may optimize the total execution time of the overall branch structure by using a characteristic that an II value of the short path in the irregular branch is small, thereby implementing a mapping optimization of a loop execution structure containing the irregular branch.

As shown in FIG. 1 to FIG. 4, according to the embodiments of the present disclosure, the analyzing source program data to determine a target irregular branch in step S101 includes:

analyzing the source program data to determine corresponding initial conversion data; and determining the target irregular branch based on an initial interval set generated from the initial conversion data.

In one example, the source program data may be an uncompiled text file formed in accordance with a certain programming language specification, consisting of a series of human-readable primitive computer language instructions. The initial conversion data is conversion data generated from an analysis and processing process of the source program data, and the conversion data may be used to determine the target irregular branch. The initial conversion data passes through a set of II values of paths corresponding to the branch structure of the initial conversion data, and a size relationship between the II values in the set may be used to determine the irregular branch. The set of the II values may be understood as the above-mentioned initial interval set.

Therefore, compared with a situation that the FP solution and the PP solution in the prior art have poor performances when the irregular branch is processed, an analysis of the source program data may be used to determine whether the source program data contains an irregular branch correspondingly, so as to further determine whether the branch structure has a short path that may optimize the II.

As shown in FIG. 1 to FIG. 4, according to an embodiment of the present disclosure, the analyzing the source program data to determine corresponding initial conversion data includes:

parsing the source program data by a compiler front end to generate an intermediate representation; and converting the intermediate representation into an initial data flow graph and an initial control flow graph by using a graph generation technology;

wherein the initial data flow graph and the initial control flow graph are the initial conversion data.

Figure 4:
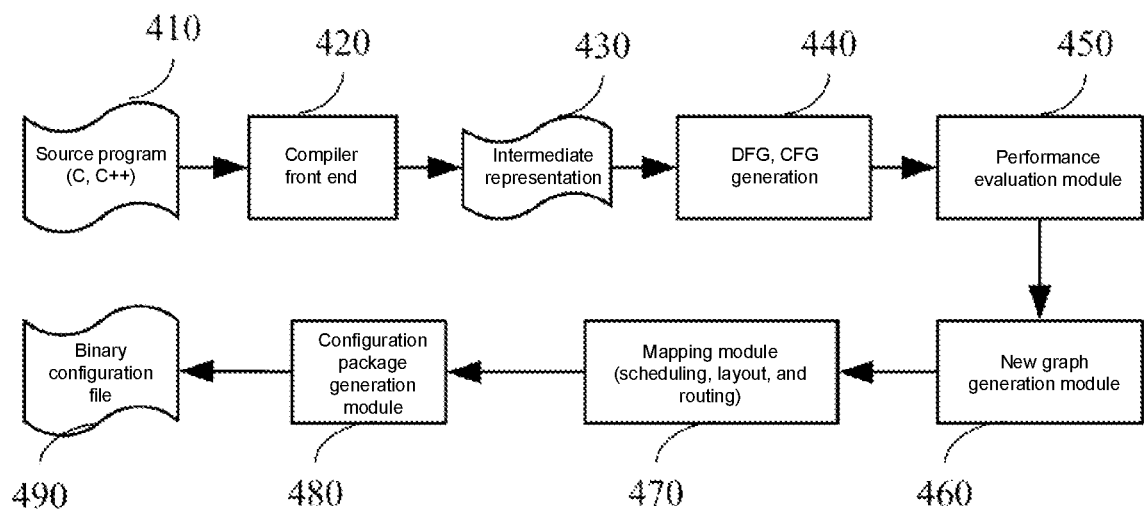
FIG. 4 schematically illustrates an application scene diagram of a method for a compilation according to the embodiments of the present disclosure.

As shown in FIG. 4, a compiler front end (e.g., a clang front end 420) is used to parse an application program (i.e., source program data, corresponding to a source program 410) described by a user in a high-level language (e.g., C, C++) into an intermediate representation LLVM IR (Low Level Virtual Machine, LLVM for short; Intermediate Representation, IR for short) 430. The LLVM IR is a generic representation that is used to characterize the specific operations of each step of the application.

After that, the intermediate representation is converted into an initial data flow graph init_DFG and an initial control flow graph init_CFG (corresponding to 440 in FIG. 4), i.e., an initial data flow graph and an initial control flow graph, using LLVM's own graph generation technology. The graph generation technology is a flow graph generation method applied to a basis of LLVM data, which will not be repeated herein. Therefore, the embodiments of the present disclosure may directly generate the initial conversion data, so that the source program data is parsed faster, and the influence on a data accuracy is smaller.

As shown in FIG. 1 to FIG. 4, according to an embodiment of the present disclosure, the determining the target irregular branch based on an initial interval set generated from the initial conversion data includes:

determining the initial interval set corresponding to the initial data flow graph and the initial control flow graph according to a number of computing units of the target hardware, wherein the initial interval set contains a long-path initial interval and a short-path initial interval; and determining the target irregular branch according to a size relationship between the long-path initial interval and the short-path initial interval.

The target hardware may contain a plurality of computing units, where the plurality of computing units may be used to determine a processing capacity of the plurality of computing units for the initial conversion data. As shown in FIG. 4, a performance evaluation module 450 may obtain a set of path IIs (i.e., a set of initial intervals) that may be achieved by the DIP solution, according to the initial data flow graph init_DFG, the initial control flow graph init_CFG (i.e., initial conversion data) and the number of the computing units (Npe) of the target hardware that are input into the module, where the set of path IIs includes a long-path II value (II_long), a short-path II value (II_short), and an overall-branch II value (II_total). Whether the branch structure of the initial conversion data is an irregular branch which may be optimized by a DIP may be confirmed by comparing the long-path II value, the short-path II value and the II value of the overall branch in size. When an irregular branch that may be optimized by the DIP solution exits in the initial conversion data, the irregular branch may be determined as the target irregular branch.

Therefore, compared with a situation that the FP solution and the PP solution in the prior art have poor processing capacities for the irregular branch, the DIP solution may be used to achieve a rapid analysis and determination of the irregular branch, so as to improve an efficiency and precision of irregular branch optimization.

As shown in FIG. 1 to FIG. 4, according to an embodiment of the present disclosure, the determining the initial interval set corresponding to the initial data flow graph and the initial control flow graph according to a number of computing units of the target hardware includes:

respectively counting a number of operations in a first basic block belonging to the initial control flow graph and a number of operations in a second basic block belonging to the initial control flow graph, so as to determine a path length of a branch structure and the initial interval set.

The initial conversion data is analyzed and processed, and the number of operations in basic blocks belonging to the initial control flow graph init_CFG in the initial data flow graph init_DFG is counted, so as to determine whether two path lengths of the ITE structure are equal and whether the II value of the ITE structure is the same. The basic blocks include at least two types of basic blocks, for example, the first basic block may be a true basic block, and the second basic block may be a false basic block. The number of operations in each type of basic block is not necessarily the same. Specifically, according to the initial data flow graph init_DFG, the initial control flow graph init_CFG and the number of computing units in the hardware platform that are input, the above-mentioned MII calculation formula is used to calculate a minimum II that may be achieved when the branch is processed by using the PP solution, the FP solution and the DIP solution for the source program, respectively. Specifically, the number of occupied computing units may be calculated by counting the number of operations in a data flow graph corresponding to each solution.

Compared with a method for calculating the II by considering all operation nodes of the overall branch and a data dependency relationship between iterations in the PP solution and the FP solution in the prior art, the DIP solution of the embodiments of the present disclosure may perform an II optimization by utilizing a difference between a short-path II and an overall branch II, so that the acquisition process of the II value is faster and more accurate.

As shown in FIG. 1 to FIG. 4, according to an embodiment of the present disclosure, the determining the target irregular branch according to a size relationship between the long-path initial interval and the short-path initial interval includes: when the short-path initial interval is smaller than the long-path initial interval, the branch structure is the target irregular branch.

Generally, if path lengths are not equal, and in an extreme case, even only one path exists alone (e.g., if only an if branch exists, it may be considered that one of the path lengths may has a length of 0), the ITE structure may be understood as an irregular branch. However, not all irregular branches may have a performance benefit using the above-mentioned DIP solution, and whether the "path IIs" (i.e., the above-mentioned II_short and II_long) of the irregular branch are equal needs to be further determined. When the short path II value (II_short) is smaller than the long path II value (II_long), it may be determined that a short path that may optimize the II exists, that is, it may be determined that the branch structure is a target irregular branch to be optimized. At this time, the branch structure may be accelerated better using the DIP solution.

As shown in FIG. 1 to FIG. 4, according to the embodiments of the present disclosure, the generating an update data flow graph according to the target irregular branch in step S102 includes:

determining a target node of the target irregular branch; and generating the update data flow graph according to a data dependency relationship of the target node and an operation control relationship between the target node and the initial data flow graph.

As shown in FIG. 4, nodes of the long and short paths are copied and a data edge and a control edge are added according to the II_long, II_short and II_total of the target irregular branch output by a performance evaluation model 450, and then a data flow graph DIP_DFG (i.e., an update data flow graph) of the DIP solution is output. Generally, the II_long of the target irregular branch is an integer multiple of the II_short, so only a short-path node needs to be copied. The nodes of the long path and the short path may be understood as target nodes of the above-mentioned target irregular branch. The control edge includes an edge between a condition calculation node and a node dominated by the condition calculation node, and an edge between an initial condition calculation node and a condition node newly added by performing a copy processing of the target irregular branch. A signal generated by a source operation node of the control edge determines whether a target node of the control edge executes or not at runtime.

As shown in FIG. 1 to FIG. 4, according to an embodiment of the present disclosure, the determining a target node of the target irregular branch includes:
  determining a number of node replication times of the target irregular branch according to an output overall-branch pipeline kernel and a path initial interval relationship of the target irregular branch, wherein the path initial interval relationship is a preset relationship between the number of node replication times, the overall-branch pipeline kernel, and an initial interval of a long-path pipeline kernel, wherein the initial interval of the long-path pipeline kernel is correspond to the target irregular branch; and
  copying the node copying times on the nodes contained in the target irregular branch to determine the target nodes of the target irregular branch.

As the branch structure is a set of static configuration, the overall branch structure has an overall-branch pipeline kernel (the pipeline is divided into three parts of a preamble, a kernel and an epilogue, and an optimized part is mainly a kernel part of the overall branch pipeline), and an II value of the overall-branch pipeline kernel is marked as II_total. The II value of the overall-branch pipeline kernel is the least common multiple of an II value (II_long) of a long-path pipeline kernel and an II value (II_short) of a short-path pipeline kernel. Generally, the II_long may be divisible by the II_short, and the II_long is usually larger than the II_short, so the II_total is usually equal to the II_long. Therefore, only a node contained in (II_total/II_short)−1 short path needs to be copied.

The DIP solution implements a function that the II value is dynamically variable among different iterations during a running process by copying several short-path examples, and fully utilizes characteristics of a short execution time of the short path, a small II limited by resource dependence, and a fast iteration. In addition, in the prior art, an II of the PP and FP solutions remain constant during a running process of the overall program, and the II is determined by the number of operations and an iteration dependence of the overall branch structure, without distinguishing the path II; therefore, when the short path is executed, it is still require to wait the same time as the time when the long path is executed, so as to obtain a result, resulting in poor performances.

The DIP solution allows the long and short paths for different iterations to be executed in parallel by adding an example of the short path, and when a plurality of continuous short paths are executed, an execution time of the short path may be hidden by the long path. That is, the long path is selected to be executed in the $i^{th}$ iteration, and an end time of calculation may be the same as an end time when the short path is executed in the $(i+1)^{th}$ and $(i+2)^{th}$ iterations, so that three iterations may be executed in one long-path execution time. Therefore, the DIP solution may further shorten a total execution time and an average II of the irregular branch.

As shown in FIG. 1 to FIG. 4, according to an embodiment of the present disclosure, the generating the update data flow graph according to a data dependency relationship of the target node and an operation control relationship between the target node and the initial data flow graph includes:
  adding a corresponding data edge and a corresponding control edge for the target node in the initial data flow graph and adding a corresponding control edge for a node of the target irregular branch in the initial data flow graph according to a data dependency relationship of the initial data flow graph and a control dependency relationship of an initial path switching, so as to generate the update data flow graph.

In one example, after a node is copied, a corresponding data edge and a corresponding control edge need to be added according to a data dependency relationship of the initial data flow graph init_DFG and a control dependency relationship between an initial short path and a newly-added short-path copy during a path switching. The target node refers to a newly added node, and a data edge and a control edge need to be added to the newly added node. At the same time, a control edge also needs to be added to the initial node.

As shown in FIG. 4, a new graph generation module 460 adds a corresponding coarse-grained (32-bit) data edge and a fine-grained (1-bit) control edge to the node in the initial data flow graph init_DFG, so as to generate an update data flow graph DIP_DFG. Two pipelines are provided, the two pipelines may share some common nodes (i.e., common nodes), and a selection of the pipelines is dynamic, so a dynamic switching is required. A short-path II is small and may be executed frequently; while a long-path II is large and an iteration interval time of two long paths is long. When a switching between the "long-short" and "short-long" is performed, original non-working/working node needs to be enabled or disabled, and thus a control dependency (i.e., the above-mentioned control dependency relationship) exits.

As shown in the embodiments of the present disclosure that the short-path node is copied according to the II_long, the II_short and the II_total output by the performance evaluation module 450, and then output data of the data edge and the control edge is added to the initial conversion data, so as to obtain the update data flow graph. The embodiments of the present disclosure may implement a more efficient and rapid data processing flow than the FP solution and the PP solution in the prior art.

As shown in FIG. 1 to FIG. 4, according to the embodiments of the present disclosure, the mapping the update data flow graph to a target hardware to complete the compilation in step S103 includes:
  mapping the update data flow graph to a time-expanded abstract graph of the target hardware to generate a mapping result; and
  performing a translate conversion on the mapping result to obtain a binary configuration file executed on the target hardware, so as to complete the compilation.

As shown in FIG. 4, a mapping module 470 statically maps the update data flow graph DIP_DFG to the target hardware for execution. Specifically, the update data flow graph DIP_DFG is statically mapped to a time-expanded abstract graph of the target hardware so as to generate a mapping result, and the mapping result is further translated and converted according to a configuration package format of the target hardware so as to finally generate a binary configuration file executed on a hardware.

The mapping is a process of mapping a node (i.e., an operation) and an edge (i.e., data and control dependency relationships between operations) in the update data flow graph DIP_DFG to a node (i.e., a computing unit) and an edge (i.e., an interconnection path between computing units) in the time-expanded hardware abstract graph, and may be specifically divided into three continuous aspects of scheduling, layout, and routing.

As shown in FIG. 1 to FIG. 4, the mapping the update data flow graph to a time-expanded abstract graph of the target hardware to generate a mapping result includes:

determining an execution time of at least one operation in the update data flow graph;

building a mapping relationship between the at least one operation and at least one computing unit of the target hardware according to the execution time; and mapping at least one edge in the update data flow graph to a corresponding edge of an interconnect line in the abstract graph according to the mapping relationship, so as to generate the mapping result.

The scheduling is to determine an execution time of each operation in the update data flow graph DIP_DFG in a topological sorting mode; the layout is responsible for placing an operation with a time attribute on a computing unit of a corresponding target hardware so as to implement an establishment of the above-mentioned mapping relationship; and the routing maps an edge in the DIP_DFG to an interconnection line in a time-expanded resource abstract graph of the target hardware according to the mapping relationship of the above-mentioned layout, thereby completing the mapping. A guarantee is needed that operations at both ends of the corresponding edge in the DIP_DFG and computing units at both ends of an interconnection of a time-expanded hardware resource abstract graph are in one-to-one correspondence in the layout, that is, the mapping relationship.

As shown in FIG. 4, the mapping module 470 maps the update data flow graph DIP_DFG containing data dependency and control dependency relationships to a time-expanded hardware abstract model graph. The update data flow graph DIP_DFG represents operations contained in the source program and data and control dependency relationships between the operations. The time-expanded hardware abstract model graph represents the number, a spatial distribution and an interconnection relationship of the computing units of the target hardware. Each computing unit is represented by a binary set (t, num), where t represents time and num represents a computing unit label.

As shown in FIG. 1 to FIG. 4, according to an embodiment of the present disclosure, the building a mapping relationship between the at least one operation and at least one computing unit of the target hardware according to the execution time includes:

querying the at least one computing unit not occupied in the execution time;

querying a hardware interconnect resource not occupied in the execution time; and mapping the at least one operation to a unit label of the at least one computing unit one-to-one, and mapping the at least one edge to the hardware interconnect resource one-to-one, so as to build the mapping relationship.

On one hand, after an execution time T (op) of each operation op in the update data flow graph DIP_DFG is determined through the scheduling, computing units that are not occupied at the time are searched according to the T (op). By querying hardware interconnection resources that are not occupied within the execution time corresponding to at least one edge of the update data flow graph, one of the hardware interconnection resources is randomly selected to place the operation. That is, the operation op is mapped to an unit label num of a corresponding computing unit, and at least one edge is mapped to at least one hardware interconnection resource one-to-one, so as to complete the layout. The hardware interconnection resource is a resource which may be used for hardware communication or data transfer, such as a Mux multiplexer, various registers, an IO port, a bus, and the like.

In summary, the above-mentioned mapping relationship may be built according to unoccupied computing units corresponding to the execution time and/or unoccupied hardware interconnect resources within a corresponding execution time.

Further, a corresponding edge (num1→num2, where op1 corresponds to num1 in the layout and op2 corresponds to num2 in the layout) is found in the interconnection line of the time-expanded hardware abstract model graph according to an edge (eg. op1→op2) between operations in the update data flow graph DIP_DFG, and an edge of the hardware abstract model graph is ensured not to be occupied by other edges of the update data flow graph in a corresponding time period, so as to complete the routing.

The mapping process of the scheduling, layout and routing may be well implemented by applying a mapping algorithm of the DIP solution than a simple mapping process of the PP solution and the FP solution in the prior art. For the DIP solution, due to an explicit transfer of complex control flow, the mapping also needs to determine a calculation mode of each fine-grained control signal in addition to conventional scheduling, node layout and edge routing. Therefore, a function of a fine-grained control signal calculation is separately added to the DIP solution in the mapping module 470 of "scheduling, layout and routing". The mapping process may be more accurate and effective by analyzing a type of the control edge. After the mapping is completed, the mapping result may clearly indicate a corresponding relation between the operation and edge in the update data flow graph DIP_DFG and the time-expanded hardware resource abstract graph.

According to an embodiment of the present disclosure, the performing a translate conversion on the mapping result to obtain a binary configuration file executed on the target hardware, so as to complete the compilation includes:

performing an information extraction and conversion on the mapping result according to a configuration package format of the target hardware, so as to generate the binary configuration file; and executing the binary configuration file through the target hardware.

The configuration package format is a preset data translation format corresponding to the target hardware, and may be used for a configuration package generation module 480 so as to perform a customized translation on the mapping result, thereby forming a binary configuration file 490 that may be recognized by the target hardware. Configuration package formats supported by different hardware are different, and the mapping result only visually gives a corresponding relation, so that a process of customizing a translation involves an extraction and a conversion of execution information represented by the mapping result. The above-mentioned binary configuration file is mainly used to indicate information such as what operation each computing unit performs, what source and destination of the operation data are and what signals the operation is controlled by, and the information may be extracted from the mapping result. An generated binary configuration file may be directly executed on the target hardware.

Therefore, compared with a situation that the FP solution and the PP solution in the prior art may not perform an optimization processing on the irregular branch, the method according to the embodiments of the present disclosure may fully mine characteristics (including the irregular branch structure) of the branch structure in the source program to solve the problem of poor performances when the irregular branch is processed in the existing predicate technology, thereby maximizing a performance benefit of the compilation process.

According to an embodiment of the present disclosure, before generating the update data flow graph according to the target irregular branch, the method further includes:

analyzing a size relationship between minimum initial intervals of a plurality of pipeline solutions corresponding to the source program data; and selecting a pipeline solution having a smallest minimum initial interval from the plurality of pipeline solutions as a target pipeline solution according to the size relationship between the minimum initial intervals, wherein the plurality of pipeline solutions contain a first pipeline solution based on a partial predication technology, a second pipeline solution based on a full predication technology, and a third pipeline solution based on the embodiments of the present disclosure; and in this case, the generating an update data flow graph according to the target irregular branch includes:

generating the update data flow graph according to the target irregular branch when the target pipeline solution is the third pipeline solution.

It may be understood that the above-mentioned first pipeline solution is a method for compiling the PP solution based on a partial predication technology, the second pipeline solution is a method for compiling the FP solution based on a full predication technology, and the third pipeline solution is a method for compiling the DIP solution of the above-mentioned dynamic initial interval pipeline. Each pipeline solution in the plurality of pipeline solutions may be processed for a different branch structure to obtain a different initial interval. Thus, the size relationship between the minimum initial intervals is a size relationship between minimum initial intervals of the pipeline solutions.

Therefore, compared with a situation that an existing conventional method for a compilation may only implement one branch processing technology, and may implement the best performance in some applications and poor performances in some applications in which the branch processing technology is not applicable, the above-mentioned method for a mixed branch processing compilation integrating three branch processing solutions of the PP solution, the FP solution and the DIP solution may be applied to branch structures with different characteristics. That is, since the method is actually a mixture of three branch processing methods, a most suitable method may be selected from the three methods for each specific source program to be processed. Therefore, the method for a mixed branch processing compilation may perform a customized processing optimization on various forms of branch structures, so as to achieve a better performance and make a target code applicable to the compilation system wider.

According to the embodiments of the present disclosure, the analyzing a size relationship between minimum initial intervals of a plurality of pipeline solutions corresponding to the source program data includes:

parsing the source program data to determine initial conversion data; and determining, according to a number of computing units of the target hardware, an achievable first minimum initial interval, an achievable second minimum initial interval and an achievable third minimum initial interval when the first pipeline solution, the second pipeline solution and the third pipeline solution are respectively used for the initial conversion data to process a branch, so as to determine a size relationship between the minimum initial interval of the first pipeline solution, the minimum initial interval of the second pipeline solution and the minimum initial interval of the third pipeline solution.

As described above, the performance evaluation module may calculate, according to the initial data flow graph (init_DFG) and the Control Flow Graph (CFG) (i.e., the initial conversion data) generated from the intermediate representation and the number of target hardware calculation units (Npe), the minimum II that may be achieved when the branch structure of the source program is processed by respectively using the PP solution, the FP solution and the DIP solution for the source program by using the above-mentioned MII calculation formula, where the PP solution corresponds to a first minimum initial interval achieved by processing the branch structure, the FP solution corresponds to a second minimum initial interval achieved by processing the branch structure, and the DIP solution corresponds to a first minimum initial interval achieved by processing the branch structure. The number of occupied computing units and the number of hardware interconnection resources may be calculated by counting the number of operations and the number of edges in a data flow graph corresponding to each solution.

Therefore, a comprehensive evaluation may be performed according to the II value, the number of nodes, the number of edges and other indexes, and a suitable branch processing method may be selected from the above-mentioned FP solution, PP solution and DIP solution.

According to an embodiment of the present disclosure, the selecting a pipeline solution having a smallest minimum initial interval from the plurality of pipeline solutions as a target pipeline solution according to the size relationship between the minimum initial intervals includes:

determining one of the first pipeline solution, the second pipeline solution and the third pipeline solution as the target pipeline solution by comparing the first minimum initial interval, the second minimum initial interval and the third minimum initial interval;

wherein one of the first pipeline solution, the second pipeline solution and the third pipeline solution is determined as the target pipeline solution according to a carrying capacity of the target hardware when the first minimum initial interval, the second minimum initial interval and the third minimum initial interval are identical to each other.

The II is a first criterion for selecting a target pipeline solution, and a solution with a smaller II is preferred as a method for processing the source program, i.e., the target pipeline solution. When the II is the same, the FP solution, the PP solution and the DIP solution are sequentially selected according to consideration of bearing capacities of the target hardware such as power consumption, implementation complexity and the like. The FP is preferably selected because the FP_DFG corresponding to the FP contains the smallest number of operations, so that an overhead of power consumption and compilation time (positively correlated to a size of the DFG) is minimal, the short path does not need to be copied, and the implementation complexity is low. The performance evaluation module determines a branch processing method to be adopted for a current source program and a corresponding II value of the method. The irregular branch of the branch structure may be processed through the DIP solution.

Therefore, in the embodiments of the present disclosure, a processing of source programs with different branch structures is determined according to corresponding II values of different initial conversion data, which has a wider application range, and may reduce an influence of adverse factors on data processing, so as to improve accuracy and effectiveness of the data processing.

According to an embodiment of the present disclosure, the method further includes:
  adding a fine-grained select signal to an initial data flow graph of an initial conversion data according to a selection operation when the pipeline solution is the first pipeline solution;
  adding a fine-grained enable control edge to an initial data flow graph of an initial conversion data when the pipeline solution is the second pipeline solution; and
  adding a node, a coarse-grained data edge and a fine-grained enable control edge to an initial data flow graph of an initial conversion data when the pipeline solution is the third pipeline solution.

A corresponding update data flow graph new_DFG is generated by a graph generation algorithm according to a selected processing method, wherein the new_DFG may be at least one of the PP_DFG, the FP_DFG and the DIP_DFG, and a newly generated new_DFG contains both coarse-grained and fine-grained edges.

For the PP_DFG, there is provided a selection operation (i.e., an operation for performing a selection) which newly adds a fine-grained selection signal from a conditional computation node to the selection operation compared with the initial data flow graph init_DFG of the initial conversion data; for the FP_DFG, compared with the initial data flow graph init_DFG of the initial conversion data, a fine-grained enable control edge from the conditional computation node to each operation in the branch structure is newly added; for the DIP_DFG, compared with the initial data flow graph init_DFG of the initial conversion data, a node and a coarse-grained data edge (i.e., a copy of copying the short path in an initial DFG) and a fine-grained enable control edge between conditional computation nodes, a fine-grained enable control edge from the conditional computation nodes to each operation in the branch structure and the like are newly added.

Compared with a situation that the existing conventional method for a compilation may only implement one branch processing technology, the above-mentioned method for a mixed branch processing compilation integrating three branch processing solutions of the PP solution, the FP solution and the DIP solution may be applied to branch structures with different characteristics, that is, the method for a mixed branch processing compilation may be used to perform a customized processing and optimization on various forms of branch structures, so as to achieve a better performance and make a target code applicable to the compilation system wider.

The above-mentioned method for the mixed branch processing compilation may be used to construct a framework with the mixed branch processing compilation, and the framework may complete an overall compilation process, and convert an application program described by a user in a high-level language into a binary configuration file that is functionally equivalent and may be executed on the target hardware. The compilation and optimizing framework integrates three technologies of processing the branches, i.e., the PP solution, the FP solution and the above-mentioned DIP solution.

This shows that a mixed branch processing compilation framework is a general-purpose compiler, and may compile various loops containing branches so as to complete a conversion from the source program to a machine language recognizable by the hardware. The mixed branch processing compilation framework may implement a better performance for different types of branches than other compilers which only contain a single branch processing mechanism.

Figure 5:
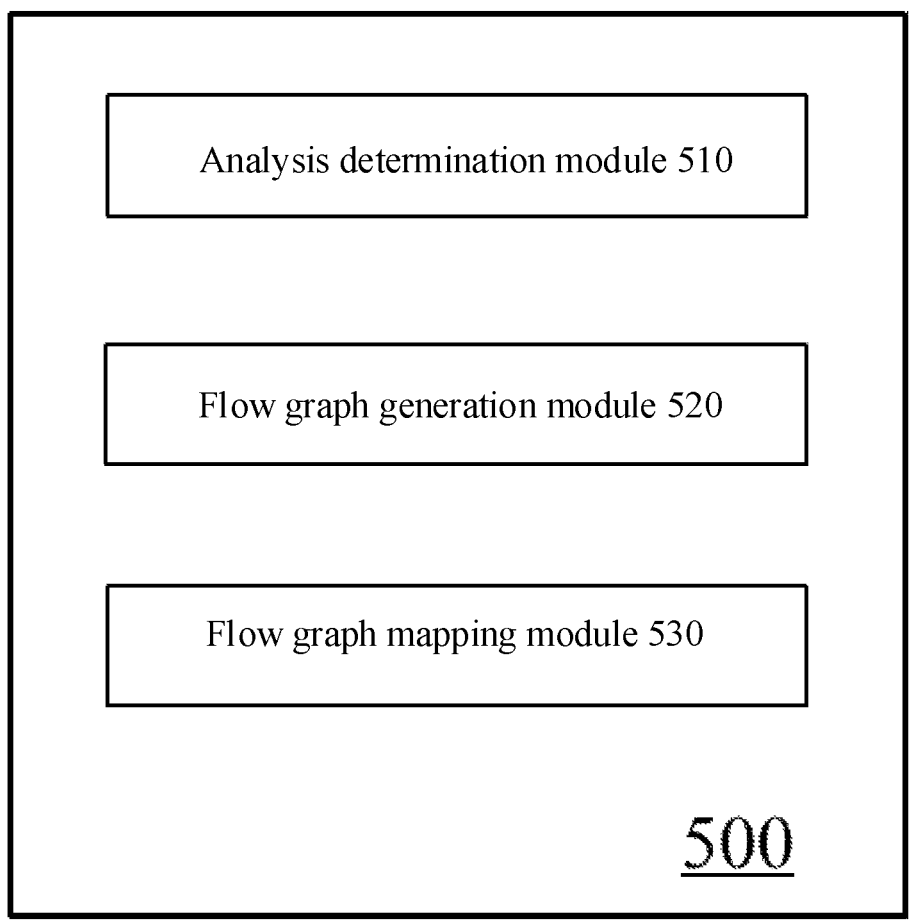
FIG. 5 schematically illustrates a composition diagram of an apparatus for a compilation according to the embodiments of the present disclosure.

As shown in FIG. 5, another aspect of the present disclosure provides a compilation apparatus 500, where the compilation apparatus 500 includes an analysis determination module 510, a flow graph generation module 520, and a flow graph mapping module 530.

The analysis determination module 510 is used to analyze source program data to determine a target irregular branch;
  the flow graph generation module 520 is used to generate an update data flow graph according to the target irregular branch; and
  The flow graph mapping module 530 is used to map the update data flow graph to a target hardware to complete the compilation.

The above-mentioned apparatus 500 may include a specific compiler for compiling a loop structure containing various branches to complete a conversion from the source program to the machine language recognizable by the hardware. The apparatus 500 achieves a better performance for different types of branches than other compilers that contain only a single branch processing mechanism.

It should be noted that the embodiments of the above-mentioned apparatus 500 is similar to the embodiments of the above-mentioned method for compiling the DIP solution, and technical effects to be achieved are also similar, which will not be repeated herein.

Figure 6:
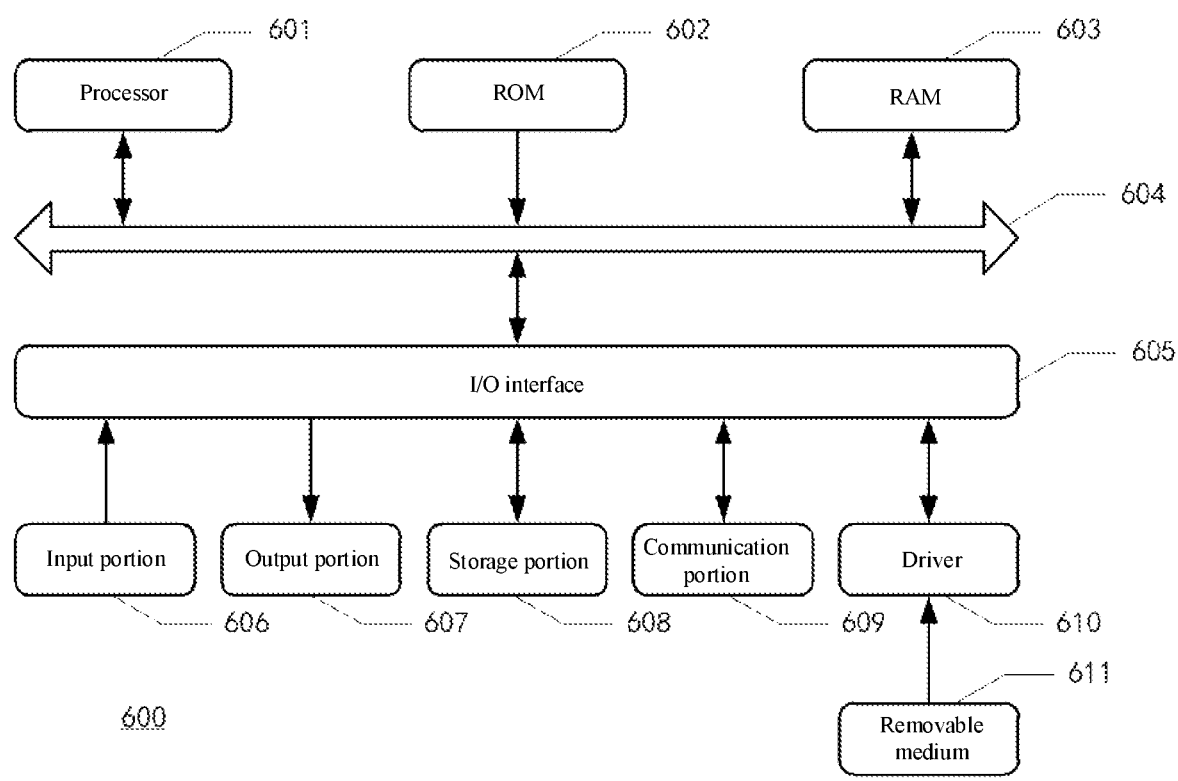
FIG. 6 schematically shows an architecture diagram of an electronic device according to the embodiments of the present disclosure.

As shown in FIG. 6, another aspect of the present disclosure provides an electronic device 600, including: one or more processors; a storage for storing one or more programs, wherein the one or more programs, when executed by the one or more processors, cause the one or more processors to perform the above-mentioned method for a compilation.

As shown in FIG. 6, the electronic device 600 according to the embodiments of the present disclosure includes a processor 601 that may perform various appropriate actions and processes according to a program stored in a Read Only Memory (ROM) 602 or a program loaded from a storage portion 608 into a Random Access Memory (RAM) 603. The processor 601 may include, for example, a general-purpose microprocessor (e.g., a CPU), an instruction set processor and/or associated chipset, and/or a special purpose microprocessor (e.g., an Application Specific Integrated Circuit (ASIC)), and the like. The processor 601 may also include an on-board memory for caching purposes. The processor 601 may include a single processing unit or a plurality of processing units for performing different actions of a method flow according to embodiments of the present disclosure.

In the RAM 603, various programs and data necessary for an operation of the electronic device 600 are stored. The processor 601, the ROM 602 and the RAM 603 are connected to each other via a bus 604. The processor 601 performs various operations of the method flow according to the embodiments of the present disclosure by executing various programs in the ROM 602 and/or RAM 603. Note that the programs may also be stored in one or more memories other than the ROM 602 and the RAM 603. The processor 601 may also perform various operations of the method flow according to embodiments of the present disclosure by executing programs stored in the one or more memories.

According to the embodiments of the present disclosure, the electronic device 600 may also include an input/output (I/O) interface 605, where the input/output (I/O) interface 605 may also be connected to the bus 604. The electronic device 600 may also include one or more of following components connected to the I/O interface 605: an input portion 606 containing a keyboard, a mouse, and the like; an output portion 607 containing a Cathode Ray Tube (CRT), a Liquid Crystal Display (LCD), and the like, and a speaker and the like; a storage portion 608 containing a hard disk and the like; and a communication portion 609 containing a network interface card such as a LAN card, a modem, or the like. The communication portion 609 performs a communication processing via a network such as an internet. A driver 610 is also connected to the I/O interface 605 as needed. A removable medium 611 such as a magnetic disk, an optical disk, a magneto-optical disk, a semiconductor memory, or the like is installed on the drive 610 as needed, so that a computer program read therefrom is installed in the storage portion 608 as needed.

Another aspect of the present disclosure provides a computer-readable storage medium having executable instructions stored thereon, wherein the instructions, when executed by a processor, cause the processor to perform the above-mentioned method for a compilation.

The present disclosure further provides a computer-readable storage medium, which may be contained in a device/apparatus/system described in the above embodiments; or may exist alone without being assembled into the device/apparatus/system. The above-mentioned computer-readable storage medium carries one or more programs that, when executed by the one or more programs, implement the method according to the embodiments of the present disclosure.

According to the embodiments of the present disclosure, the computer-readable storage medium may be a non-volatile computer-readable storage medium, and may include, for example but is not limited to: a portable computer diskette, a hard disk, a Random Access Memory (RAM), a read-only memory (ROM), an erasable programmable read-only memory (EPROM or flash memory), a portable compact disc read-only memory (CD-ROM), an optical storage device, a magnetic storage device, or any suitable combination thereof. In the present disclosure, the computer-readable storage medium may be any tangible medium containing or storing a program that may be used by or in connection with an instruction execution system, apparatus, or device. For example, according to the embodiments of the present disclosure, the computer-readable storage medium may include the ROM 602 and/or RAM 603 and/or one or more memories other than the ROM 602 and RAM 603.

Another aspect of the present disclosure provides a computer program product including a computer program, wherein the computer program, when executed by a processor, implements the above-mentioned method for a compilation.

Embodiments of the present disclosure further include a computer program product including a computer program, wherein the computer program contains a program code for performing the method illustrated in a flow diagram. When the computer program product runs on a computer system, the program code is used to cause the computer system to perform the method according to the embodiments of the present disclosure.

The computer program, when executed by the processor 601, performs the above-mentioned function defined in the system/apparatus of the embodiments of the present disclosure. According to the embodiments of the present disclosure, the above-mentioned systems, devices, modules, units, and the like may be implemented by a computer program module.

In one embodiment, the computer program may rely on a tangible storage medium such as an optical storage device, a magnetic storage device, and the like. In another embodiment, the computer program may also be transmitted, distributed in the form of a signal over a network medium, downloaded and installed through the communication portion 609, and/or installed from the removable medium 611. The program code contained in the computer program may be transmitted using any suitable network medium, including but not limited to: wireless, wired, etc., or any suitable combination thereof.

In such an embodiment, the computer program may be downloaded and installed from a network through the communication portion 609 and/or installed from the removable medium 611. The computer program, when executed by the processor 601, performs the above-mentioned function defined in the system according to the embodiments of the present disclosure. According to the embodiments of the present disclosure, the above-mentioned systems, devices, apparatuses, modules, units, and the like may be implemented by a computer program module.

According to the embodiments of the present disclosure, the program code for executing the computer program provided by the embodiments of the present disclosure may be written in any combination of one or more programming languages, and in particular, the computer program may be implemented using a high-level procedural and/or object-oriented programming language, and/or an assembly/machine language. The programming languages include, but is not limited to, languages such as Java, C++, python, "C", or similar programming languages. The program code may execute entirely on a user computing device, partly on a user device, partly on a remote computing device, or entirely on the remote computing device or a server.

A flow diagram and block diagrams in the drawings illustrate an architecture, functionality, and operations that may be implemented in systems, methods and computer program products according to various embodiments of the present disclosure. In this regard, each block in the flow diagram or block diagrams may represent a module, program segment, or portion of code, and the module, program segment, or portion of code contains one or more executable instructions for implementing specified logical function(s). It should also be noted that, in some alternative implementations, functions noted in blocks may occur out of a order noted in the drawings. For example, two blocks shown in succession may, in fact, be executed substantially concurrently, or the blocks may sometimes be executed in a reverse order, depending upon the functionality involved. It is also be noted that each block of the block diagrams or flow diagram, and a combination of the blocks in the block diagrams or flow diagram, may be implemented by a specified hardware-based system that performs specified functions or operations, or a combination of a specified hardware and a computer instruction.

Those skilled in the art will appreciate that various combinations and/or incorporations of features recited in various embodiments and/or claims of the present disclosure may be made, even if such combinations or incorporations are not explicitly recited in the present disclosure. In particular, without departing from the spirit and principles of the present disclosure, various combinations and/or incorporations of the features recited in the various embodiments and/or claims of the present disclosure may be made. All of the combinations and/or incorporations fall within the scope of the present disclosure.

The embodiments of the present disclosure have been described above. However, these embodiments are for illustrative purposes only, and are not used to limit the scope of the present disclosure. Although the embodiments are described separately above, this does not mean that the measures in the embodiments may not be used advantageously in combination. The scope of the present disclosure is defined by the appended claims and their equivalents. Without departing from the spirit and principles of the present disclosure, those skilled in the art may make various alternatives and equivalent substitutions, and these alternatives and modifications should all fall within the scope of the present disclosure.

What is claimed is:

1. A method for a compilation, comprising:
analyzing source program data to determine a target irregular branch;
generating an update data flow graph according to the target irregular branch; and
mapping the update data flow graph to a target hardware, so as to complete the compilation,
wherein the mapping the update data flow graph to a target hardware to complete the compilation comprises:
mapping the update data flow graph to a time-expanded abstract graph of the target hardware to generate a mapping result; and
performing a translate conversion on the mapping result to obtain a binary configuration file executed on the target hardware, so as to complete the compilation,
wherein the mapping the update data flow graph to a time-expanded abstract graph of the target hardware to generate a mapping result comprises:
determining an execution time of at least one operation in the update data flow graph;
building a mapping relationship between the at least one operation and at least one computing unit of the target hardware according to the execution time; and
mapping at least one edge in the update data flow graph to a corresponding edge of an interconnect line in the abstract graph according to the mapping relationship, so as to generate the mapping result.

2. The method according to claim 1, wherein the analyzing source program data to determine a target irregular branch comprises:
analyzing the source program data to determine corresponding initial conversion data; and
determining the target irregular branch based on an initial interval set generated from the initial conversion data.

3. The method according to claim 2, wherein the analyzing the source program data to determine corresponding initial conversion data comprises:
parsing the source program data by a compiler front end to generate an intermediate representation; and
converting the intermediate representation into an initial data flow graph and an initial control flow graph by using a graph generation technology, wherein the initial data flow graph and the initial control flow graph are the initial conversion data.

4. The method according to claim 3, wherein the determining the target irregular branch based on an initial interval set generated from the initial conversion data comprises:
determining the initial interval set corresponding to the initial data flow graph and the initial control flow graph according to a number of computing units of the target hardware, wherein the initial interval set comprises a long-path initial interval and a short-path initial interval; and
determining the target irregular branch according to a size relationship between the long-path initial interval and the short-path initial interval.

5. The method according to claim 4, wherein the determining the initial interval set corresponding to the initial data flow graph and the initial control flow graph according to a number of computing units of the target hardware comprises:
respectively counting a number of operations in a first basic block belonging to the initial control flow graph and a number of operations in a second basic block belonging to the initial control flow graph, so as to determine a path length of a branch structure and the initial interval set.

6. The method according to claim 3, wherein the generating an update data flow graph according to the target irregular branch comprises:
determining a target node of the target irregular branch; and
generating the update data flow graph according to a data dependency relationship of the target node and an operation control relationship between the target node and the initial data flow graph.

7. The method according to claim 6, wherein the determining a target node of the target irregular branch comprises:
determining a number of node replication times of the target irregular branch according to an output overall-branch pipeline kernel and a path initial interval relationship of the target irregular branch, wherein the path initial interval relationship is a preset relationship between the number of node replication times, the overall-branch pipeline kernel, and an initial interval of a long-path pipeline kernel, and wherein the initial interval of the long-path pipeline kernel corresponds to the target irregular branch; and
performing a replication on a node contained in the target irregular branch for the number of node replication times, so as to determine the target node of the target irregular branch.

8. The method according to claim 6, wherein the generating the update data flow graph according to a data dependency relationship of the target node and an operation control relationship between the target node and the initial data flow graph comprises:
adding a corresponding data edge and a corresponding control edge for the target node in the initial data flow graph and adding a corresponding control edge for a node of the target irregular branch in the initial data flow graph according to a data dependency relationship of the initial data flow graph and a control dependency relationship of an initial path switching, so as to generate the update data flow graph.

9. The method according to claim 1, wherein the building a mapping relationship between the at least one operation and at least one computing unit of the target hardware according to the execution time comprises:

querying the at least one computing unit not occupied in the execution time;

querying a hardware interconnect resource not occupied in the execution time; and mapping the at least one operation to a unit label of the at least one computing unit respectively, and mapping the at least one edge to the hardware interconnect resource respectively, so as to build the mapping relationship.

10. The method according to claim 1, wherein the performing a translate conversion on the mapping result to obtain a binary configuration file executed on the target hardware, so as to complete the compilation comprises:

performing an information extraction and conversion on the mapping result according to a configuration package format of the target hardware, so as to generate the binary configuration file; and executing the binary configuration file through the target hardware.

11. The method according to claim 1, before the generating an update data flow graph according to the target irregular branch, further comprising:

analyzing a size relationship between minimum initial intervals of a plurality of pipeline solutions corresponding to the source program data; and selecting a pipeline solution having a smallest minimum initial interval from the plurality of pipeline solutions as a target pipeline solution according to the size relationship between the minimum initial intervals, wherein the plurality of pipeline solutions comprise a first pipeline solution based on a partial predication technology, a second pipeline solution based on a full predication technology, and a third pipeline solution based on claim 1; and wherein the generating an update data flow graph according to the target irregular branch comprises:

generating the update data flow graph according to the target irregular branch when the target pipeline solution is the third pipeline solution.

12. The method according to claim 11, wherein the analyzing a size relationship between minimum initial intervals of a plurality of pipeline solutions corresponding to the source program data comprises:

parsing the source program data to determine initial conversion data; and determining, according to a number of computing units of the target hardware, an achievable first minimum initial interval, an achievable second minimum initial interval and an achievable third minimum initial interval when the first pipeline solution, the second pipeline solution and the third pipeline solution are respectively used for the initial conversion data to process a branch, so as to determine a size relationship between the minimum initial interval of the first pipeline solution, the minimum initial interval of the second pipeline solution and the minimum initial interval of the third pipeline solution.

13. The method according to claim 11, wherein the selecting a pipeline solution having a smallest minimum initial interval from the plurality of pipeline solutions as a target pipeline solution according to the size relationship between the minimum initial intervals comprises:

determining one of the first pipeline solution, the second pipeline solution and the third pipeline solution as the target pipeline solution by comparing the first minimum initial interval, the second minimum initial interval and the third minimum initial interval, wherein one of the first pipeline solution, the second pipeline solution and the third pipeline solution is determined as the target pipeline solution according to a carrying capacity of the target hardware when the first minimum initial interval, the second minimum initial interval and the third minimum initial interval are identical to each other.

14. The method according to claim 11, further comprising:

adding a fine-grained select signal to an initial data flow graph of an initial conversion data according to a selection operation when the pipeline solution is the first pipeline solution;

adding a fine-grained enable control edge to an initial data flow graph of an initial conversion data when the pipeline solution is the second pipeline solution; and adding a node, a coarse-grained data edge and a fine-grained enable control edge to an initial data flow graph of an initial conversion data when the pipeline solution is the third pipeline solution.

15. An electronic device, comprising:

one or more processors; and a storage apparatus for storing one or more programs, wherein the one or more programs, when executed by the one or more processors, cause the one or more processors to perform the method according to claim 1.

16. A computer-readable storage medium having executable instructions stored thereon, wherein the instructions, when executed by a processor, cause the processor to perform the method according to claim 1.

* * * * *